United States Patent [19]

Singh et al.

[11] Patent Number: 5,242,873
[45] Date of Patent: Sep. 7, 1993

[54] ELECTRICALLY CONDUCTIVE MATERIAL

[75] Inventors: Jitendra P. Singh, Bollingbrook; Andrea L. Bosak, Burnam; Charles C. McPheeters; Dennis W. Dees, Woodridge, all of Ill.

[73] Assignee: ARCH Development Corporation, Chicago, Ill.

[21] Appl. No.: 182,370

[22] Filed: Apr. 18, 1988

[51] Int. Cl.$^5$ .............................................. C04B 35/48
[52] U.S. Cl. .................................... 501/103; 501/104; 501/105
[58] Field of Search .................. 501/107, 104, 105

[56] References Cited

U.S. PATENT DOCUMENTS

| | | | |
|---|---|---|---|
| 3,175,919 | 3/1965 | Smoot et al. | 501/103 |
| 3,887,387 | 6/1975 | Sturhahy | 501/104 |
| 4,226,979 | 5/1981 | Miyoshi et al. | 501/103 |
| 4,506,024 | 3/1985 | Claussen et al. | 501/105 |
| 4,647,547 | 3/1987 | Singh et al. | |
| 4,732,877 | 3/1988 | Olson et al. | 501/105 |
| 4,742,030 | 5/1988 | Masaki et al. | 501/105 |

FOREIGN PATENT DOCUMENTS

| | | | |
|---|---|---|---|
| 60-18620 | 1/1985 | Japan | 501/103 |
| 60-18667 | 1/1985 | Japan | 501/103 |
| 0159754 | 12/1963 | U.S.S.R. | 501/103 |

*Primary Examiner*—David Brunsman
*Attorney, Agent, or Firm*—Reinhart, Boerner, Van Deuren, Norris & Rieselbach

[57] ABSTRACT

An electrically conductive material for use in solid oxide fuel cells, electrochemical sensors for combustion exhaust, and various other applications possesses increased fracture toughness over available materials, while affording the same electrical conductivity. One embodiment of the sintered electrically conductive material consists essentially of cubic $ZrO_2$ as a matrix and 6-19 wt. % monoclinic $ZrO_2$ formed from particles having an average size equal to or greater than about 0.23 microns. Another embodiment of the electrically conductive material consists essentially at cubic $ZrO_2$ as a matrix and 10-30 wt. % partially stabilized zirconia (PSZ) formed from particles having an average size of approximately 3 microns.

3 Claims, 7 Drawing Sheets

ELECTRICALLY CONDUCTIVE MATERIAL

CONTRACTUAL ORIGIN OF THE INVENTION

The United States Government has rights in this invention pursuant to Contract No. W-31-109-ENG-38 between the U.S. Department of Energy and the University of Chicago representing Argonne National Laboratory.

BACKGROUND OF THE INVENTION

This invention relates generally to electrically conductive materials adapted to operate in hostile environments and is particularly directed to a zirconia-based material which is tough, highly resistant to fracture due to thermal and mechanical stress, and is conductive.

Electrically conductive materials are frequently used in hostile environments. For example, a process may only be carried out at elevated temperatures requiring any associated electrical conductors to operate at these high temperatures. High operating temperatures impose demands upon the physical structure and mechanical characteristics of the conductor. For example, temperature extremes frequently result in cracking, or other forms of deterioration, of the conductor or cause unwanted changes in the fracture stress or hardness and/or fracture toughness of the material. Extreme temperature fluctuations also place severe demands upon the electrical conductor frequently resulting in its cracking, increased susceptibility to corrosion, and general physical deterioration. Where the conductor is metal-based, prior art solutions frequently called for the addition of various combinations of alloys having desired thermal and electrical characteristics to provide the conductor with the desired characteristics. However, the lack of stability of the metal-based conductors limits their use at high temperatures.

Because of the aforementioned limitations of metal-based conductors, increasing effort has gone into the development of ceramic conductors. Ceramic-based conductors are finding increased use in such applications as solid oxide fuel cells which are characterized as operating between 700° and 1100° C. In these fuel cells, hydrogen or a high order hydrocarbon is used as the fuel and oxygen or air is used as the oxidant. The fuel cell is generally comprised of a layered structure including an anode, a cathode and an electrolyte disposed therebetween. The electrolyte insulates the cathode and anode from one another with respect to electron flow, but permits oxygen ions to flow from the cathode to the anode. The electrolyte must therefore exhibit high conductivity at these elevated temperatures while being capable of supporting the anode and cathode in a configuration which facilitates the formation of channels through which the oxygen and hydrogen may easily flow. Large cracks in the electrolyte allow fuel and air to mix and reduce cell performance.

The present invention overcomes the aforementioned limitations of the prior art by providing a tough conductive material, without adversely affecting its conductivity at high operating temperatures. The ceramic-based conductive material of the present invention is particularly adapted for use as the electrolyte in a solid oxide fuel cell or in an electrochemical sensor for combustion exhaust, but is not limited to these applications and can be used in virtually any situation where an electrical conductor is required to operate at elevated temperatures or is subjected to large fluctuations in operating temperature.

OBJECTS AND SUMMARY OF THE INVENTION

Accordingly, it is an object of the present invention to provide a rugged and strong material having high conductivity which is particularly adapted for use in hostile environments.

Another object of the present invention is to provide a zirconia-based material particularly adapted for use in solid oxide fuel cells, electrochemical sensors for combustion exhaust, and other high temperature electrochemical applications.

Yet another object of the present invention is to provide a zirconia based material for use as the electrolyte in a solid oxide fuel cell which is particularly adapted for fabrication in thin layers, i.e., on the order of 3-4 mils thick.

A further object of the present invention is to modify the microstructure and composition of zirconia in order to increase its toughness without diminishing its conductivity.

A still further object of the present invention is to substantially increase the structural reliability of a conductive material without changing its conductivity by introducing inclusions in the material which absorb energy and inhibit cracking.

The present invention contemplates a sintered electrically conductive product consisting essentially of cubic $ZrO_2$ as a matrix and at least 6 wt. % of monoclinic $ZrO_2$ or at least 5 wt. % of partially stabilized zirconia (PSZ). The monoclinic $ZrO_2$ particles added to the cubic $ZrO_2$ matrix are primarily equal to or greater than about 0.23 microns, while the PSZ particles have an average size approximately 3 than 2 microns.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED OF THE PREFERRED EMBODIMENTS

The present invention represents an improvement in the structural reliability (ability to tolerate thermal and mechanical stress) of solid oxide fuel cell (SOFC) components, with effort concentrated on improving fracture toughness of cubic $ZrO_2$ electrolyte materials. Because of experimental convenience, initial microstructural development for improvement in fracture toughness was conducted with thick rectangular bar specimens. Subsequently, these results were confirmed by a limited study on thin tapes.

In order to improve the fracture toughness of dubic first approach consists of introducing monoclinic $ZrO_2$ inclusion of appropriate particle size and volume fraction into a cubic $ZrO_2$ matrix. When the specimens made from this cubic-monoclinic $ZrO_2$ powder are heated to sintering temperature above 1200° C. for densification, the monoclinic $ZrO_2$ particles transform to tetragonal form at approximately 1030° C. While cooling frame sintering temperature, the tetragonal phase transforms back to monoclinic phase at approximately 1030° C. with an associated linear expansion of approximately 1.4%, as described in R. N. Patil and E. C. Subbarao, "Axial Thermal Expansion of $ZrO_2$ and $HfO_2$ in the Range Room Temperature to 1400° C.," J. Appl. Crystall. 2(6), 281-288 (1969). This expansion induces high stresses and associated microcracking of the cubic $ZrO_2$ matrix at the matrix-inclusion interface. These microcracks absorb energy and thus increase fracture toughness of the cubic $ZrO_2$.

A second approach contemplated by the present invention involves the introduction of fine (approximately 3 microns) partially stabilized zirconia (PSZ) particles into the cubic $ZrO_2$ matrix. The PSZ serves as crack pinning sites resulting in an increase in fracture load and improvement in fracture toughness of the cubic $ZrO_2$.

For microcracking to occur in the cubic $ZrO_2$ matrix around monoclinic $ZrO_2$ inclusions, the tensile stress in the matrix should exceed the fracture stress for the cubic $ZrO_2$ matrix and the particle size of the inclusions should be equal to or greater than a critical value $R_c$, as described in R. W. Davidge and T. J. Green, "The Strength of Two-Phase Ceramic/Glass Materials," J. Mater. Sci. 3, 629-634 (1968).

As discussed in J. P. Singh, R. B. Poeppel, J. J. James, and J. J. Picciolo, "Development of Refractory Composites With Improved Fracture Toughness," Argonne National Laboratory Report, ANL/FE-85-1, the tensile stress in the cubic $ZrO_2$ matrix was estimated by using Selsing's equation from J. Selsing, "Internal Stresses in Ceramics," J. Am. Ceram. Soc. 44(8), 419 (1961), for stresses around a spherical inclusion in an isotropic matrix due to thermal expansion coefficient mismatch between the matrix and inclusion. Selsing'sequation is as follows:

$$\sigma_r = -2\sigma_t = \frac{-(\alpha_m - \alpha_i)\Delta T}{\frac{1+\nu_m}{2E_m} + \frac{1-2\nu_i}{E_i}} (R/r)^3, \quad (1)$$

where m and i refer to matrix and inclusion, respectively, and $\sigma_r$ = radial stress,
$\sigma_t$ = tangential stress,
r = radial distance from the inclusion,
R = radius of the inclusion,
$\alpha$ = thermal expansion coefficient,
$\gamma$ = Poisson's ratio,
E = elastic modules, and
$\Delta T$ = difference between room temperature and the maximum temperature below which the stresses are no longer relaxed during cooling.

A value of 1000° C. was assumed for $\Delta T$. In order to account for the effect of expansion as a result of tetragonal to monoclinic phase transformation of the $ZrO_2$ inclusions, the linear expansion of 1.4% was added to the numerator of Equation (1). As seen in Equation (1), the maximum value of $\sigma_t$ occurs at the inclusion-matrix interface, where r=R. Using the properties values of $ZrO_2$ shown in Table I in combination with Equation (1), a maximum tensile strength in the cubic $ZrO_2$ matrix was calculated to be approximately 1727 MPa, which is much larger than the fracture stress of cubic $ZrO_2$, which is approximately 199 MPa. This result suggests the possibility of microcrack formation in the cubic $ZrO_2$ matrix if monoclinic $ZrO_2$ inclusions are of the critical size. The values shown in Table I for cubic $ZrO_2$ were obtained during laboratory testing, while the value of the expansion coefficient for monoclinic $ZrO_2$ was taken from R. Ruh, G. W. Hollenberg, S. R. Skaggs, S. D. Stoddard, F. G. Gac, and E. G. Charles, "Axial and Linear Thermal Expansion of $ZrO_2$ and $HfO_2$," Am. Ceram. Soc. Bull. 60 (4), 504-506 (1981), with the remaining values relating to the monoclinic $ZrO_2$ assumed.

TABLE I

Properties of Cubic and Monoclinic $ZrO_2$

| Property | Cubic $ZrO_2$ | Monoclinic $ZrO_2$ |
|---|---|---|
| Expansion coefficient, $\alpha$ ($10^{-6}$ °C.$^{-1}$) | 11.5 | 7.15 |
| Elastic modulus, E ($GN/m^2$) | 200.8 | 200 |
| Poisson's ratio, $\nu$ | 0.29 | 0.29 |
| Surface energy, $\gamma_s$ ($J/m^2$) | 3.7 | — |

The critical inclusion size ($R_c$) of monoclinic $ZrO_2$ particles was calculated from an equation proposed in the aforementioned Davidge and Green article, which equation is as follows:

$$i R_c \geq 8 = s/[P^2\{(1+\nu_m)/E_m + 2(1-2\nu_i)/E_i\}]. \quad (2)$$

where $$P = \frac{(\alpha_m - \alpha_i)\Delta T}{\frac{1+\nu_m}{2E_m} + \frac{1-2\nu_i}{E_i}}, \quad (3)$$

and $\gamma_s$ is the fracture surface energy of cubic $ZrO_2$. The other symbols in Equations (2) and (3) have previously been defined. Using the properties values set forth in Table I, the critical inclusion size ($R_c$) for microcrack formation was estimated to be 0.23 microns. This result suggests that the composites of cubic $ZrO_2$ with monoclinic $ZrO_2$ inclusions of critical particle size (greater than or equal to 0.23 microns) satisfy the conditions of critical stress and inclusion particle size required for the microcrack formation in the cubic $ZrO_2$ matrix.

In carrying out the present invention for rectangular bar specimens, the powder mixtures of cubic $ZrO_2$ with monoclinic $ZrO_2$ or PSZ inclusions were made by mixing cubic $ZrO_2$ powder with various amounts of monoclinic $ZrO_2$ (0 to 19 wt. %) and PSZ (0 to 30 wt. %). From the aforementioned Singh, Poeppel, James and Picciolo article, it is known that the major fraction of monoclinic $ZrO_2$ particles used in this study is larger than 0.23 microns. The largest particle of average particles size is approximately 3 microns. Each of the two powder mixtures was mixed with 5 wt. % of polyethylene glycol binder. The powder mixtures were wet milled for 16 hours in a 70% isopropyl alcohol and 30% water solution and subsequently were spray dried. Rectangular bar specimens (approximately 5.1×0.6×0.3 cm) of the composite powder were pressed in a steel die at approximately 103 $MN/m^2$. These bars were then sintered at 1450° C. for 1½ hours in an air atmosphere. The sintered specimens had densities greater than 95% theoretical. These bars were used to measure fracture toughness and elastic modules. The fracture toughness was measured by indentation technique as described in A. G. Evans, in ASTM STP 678, ed. S. W. Freiman (American Society for Testing and Materials, Philadelphia, 1979), pp. 112–135, and elastic modulus was measured by pulse echo techniques disclosed in J. Krautkramer and H. Krautkramer, *Ultrasonic Testing of Materials*, Springer-Verlag, New York (1983).

Powder mixtures for $ZrO_2$ tapes were prepared by mixing cubic $ZrO_2$ powder with appropriate amounts of monoclinic $ZrO_2$ or PSZ powder. Appropriate amounts of binder, plasticizer, deflocculent, and solvent were added to the powder(s) and ball milled to form the slip. The slip was then tape cast using the doctor blade a method. The dog bone shaped test specimens were cut out from the tapes. The single edge notch specimens were made by making a small notch on one side of the dog bone shaped specimens. The specimens were then cured in a drying oven and subsequently were sanded using 400–1200 grit papers to remove undesirable flaws. The specimens were then sintered at 1350° C. for ½ hour. The sintered specimens were loaded to fracture in tensile mode in an Instron machine. With the measured fracture load, edge notch size and specimen dimensions, fracture toughness was calculated using the equation proposed by W. F. Brown, Jr. and J. E. Srawley, *Plane Strain Crack Toughness Testing of High Strength Metallic Materials*, ASTM Special Technical Publication No. 410, American Society for Testing and Materials, Philadelphia, Pa. (1966). The electrical conductivity of the sintered tapes was measured by a four probe alternating current impedance technique.

Figure 1A:
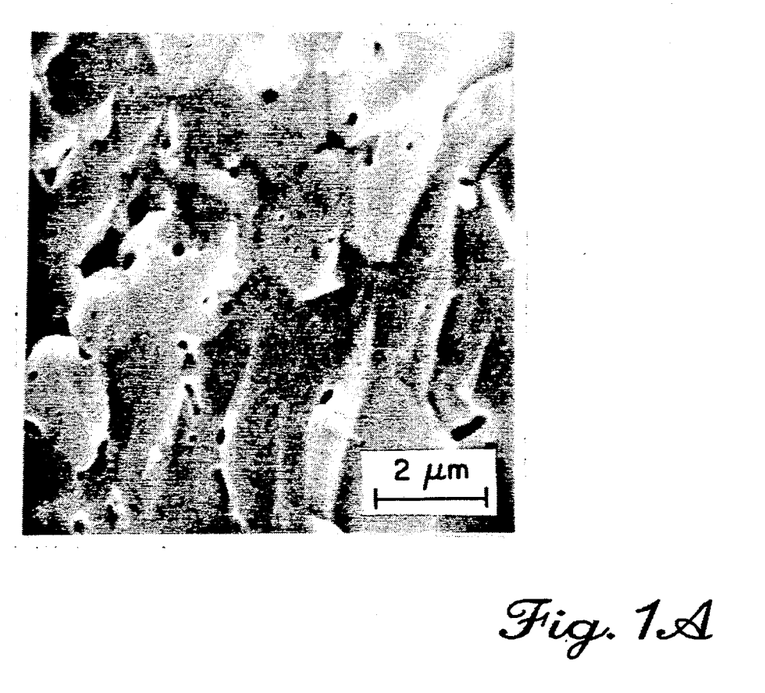
FIGS. 1a and 1b are scanning electron micrographs of the fracture surfaces of a cubic $ZrO_2$ and a cubic $ZrO_2$ and 4% monoclinic $ZrO_2$ specimen, respectively, where each of the specimens were sintered at 1450° C. for 1½ hours.
Figure 1B:
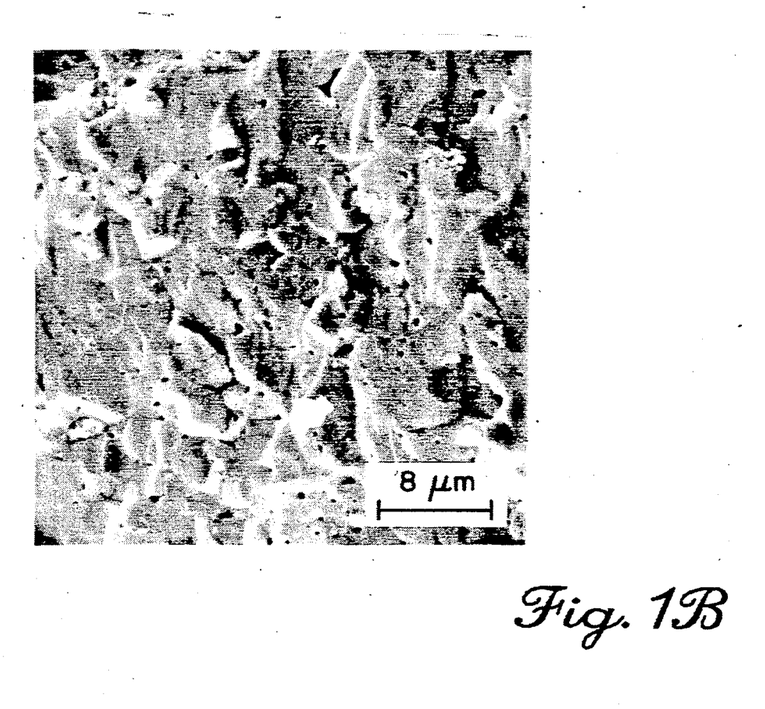

Sintered bar specimens of cubic $ZrO_2$ and its composites with monoclinic $ZrO_2$ had a density greater or equal to 96%. Typical scanning electron micrographs of the fracture surfaces of cubic $ZrO_2$ and its composite with 4 wt. % monoclinic $ZrO_2$ are respectively shown in FIGS. 1a and 1b. The largest grain is observed to be approximately 10 microns and the fracture mode is primarily transgranular.

Figure 2:
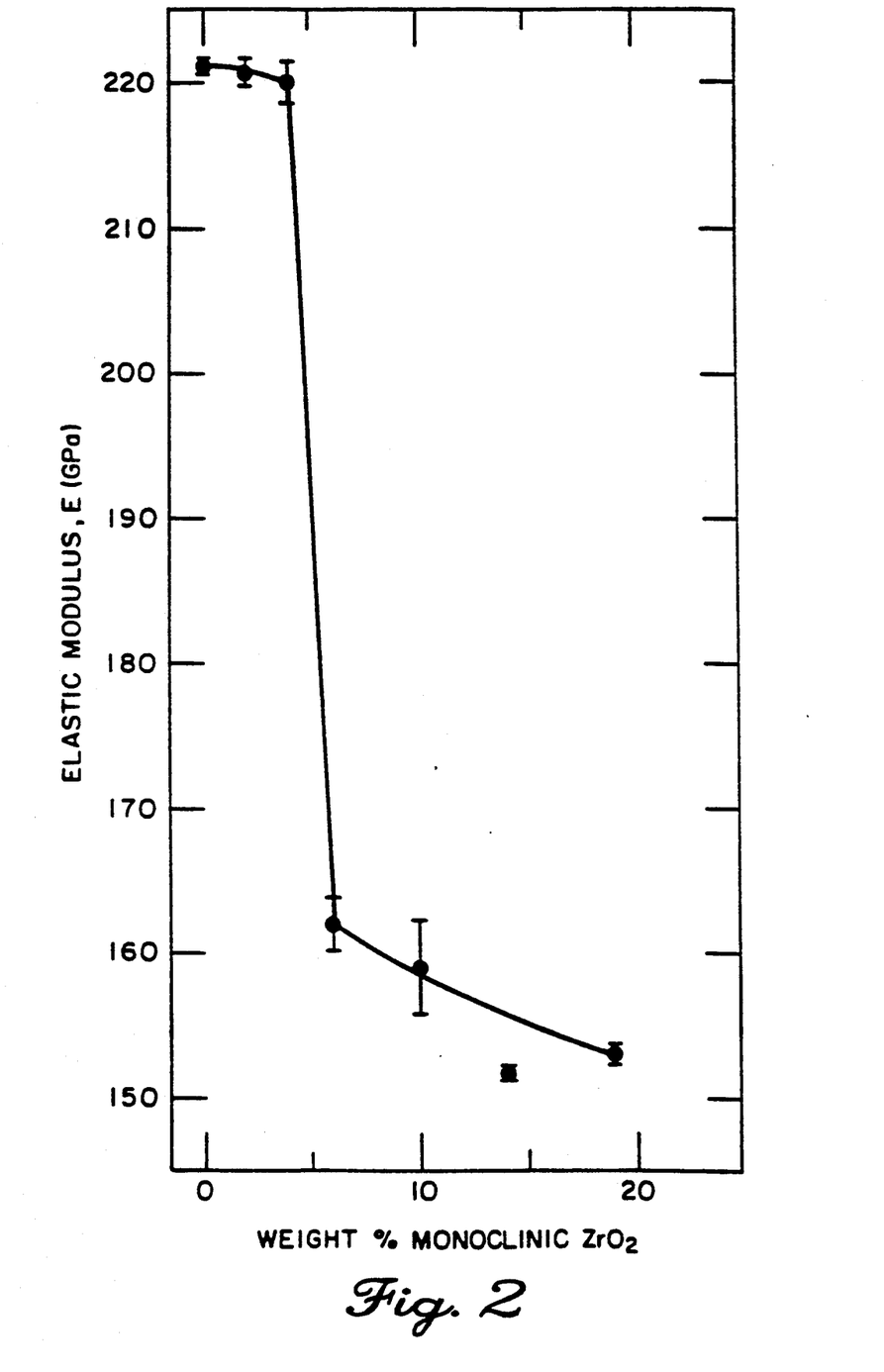
FIG. 2 is a graph illustrating the dependence of elastic modulus (E) on the monoclinic $ZrO_2$ content in cubic $ZrO_2$.
Figure 3:
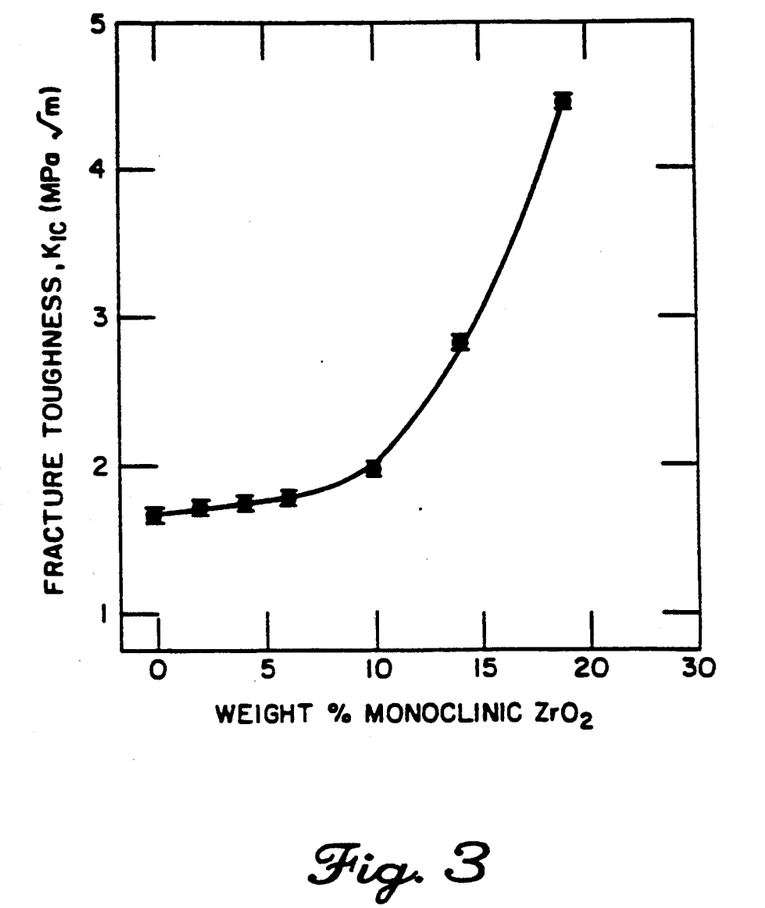
FIG. 3 is a graph illustrating the dependence of fracture toughness ($K_{IC}$) on monoclinic $ZrO_2$ content in cubic $ZrO_2$.

A plot of elastic modulus data in FIG. 2 for the cubic $ZrO_2$ matrix with monoclinic $ZrO_2$ inclusions indicates that there is very little change in elastic modulus (E) for monoclinic $ZrO_2$ content less than or equal to 4 wt. % beyond which the modulus decreases with increasing monoclinic $ZrO_2$ content. Since elastic modulus is inversely proportional to the amount and size of microcracks this result indirectly suggests that there is very little microcracking for monoclinic $ZrO_2$ contents less than or equal to 4 wt. %, above which microcracking increases with increasing monoclinic $ZrO_2$ content. Therefore, little improvement in fracture toughness is expected for monoclinic $ZrO_2$ content less than or equal to 4 wt. %. The measured fracture toughness $K_{IC}$ values presented in FIG. 3 confirm this expectation. In fact, fracture toughness ($K_{IC}$) changes very little with monoclinic $ZrO_2$ less than or equal to 6 wt. %. It is assumed that the small change in fracture toughness is because there is little or no microcracking in the matrix for these compositions. At higher monoclinic $ZrO_2$ contents, interaction between the stress fields of adjacent monoclinic $ZrO_2$ particles appear to cause critical stress conditions at the matrix-inclusion interface, resulting in microcracking of the matrix. The density of microcracking increases with increasing monoclinic $ZrO_2$ content, with this increase probably allowing for increased energy absorption with a corresponding increase in $K_{IC}$. At approximately 19 wt. % monoclinic $ZrO_2$ content, $K_{IC}$ has a value of 4.5 MPa $\sqrt{m}$. This represents approximately a 2.9 fold increase in $K_{IC}$ value of cubic $ZrO_2$ with monoclinic $ZrO_2$ as compared with the $K_{IC}$ value of the cubic $ZrO_2$ without any inclusions.

Figure 4:
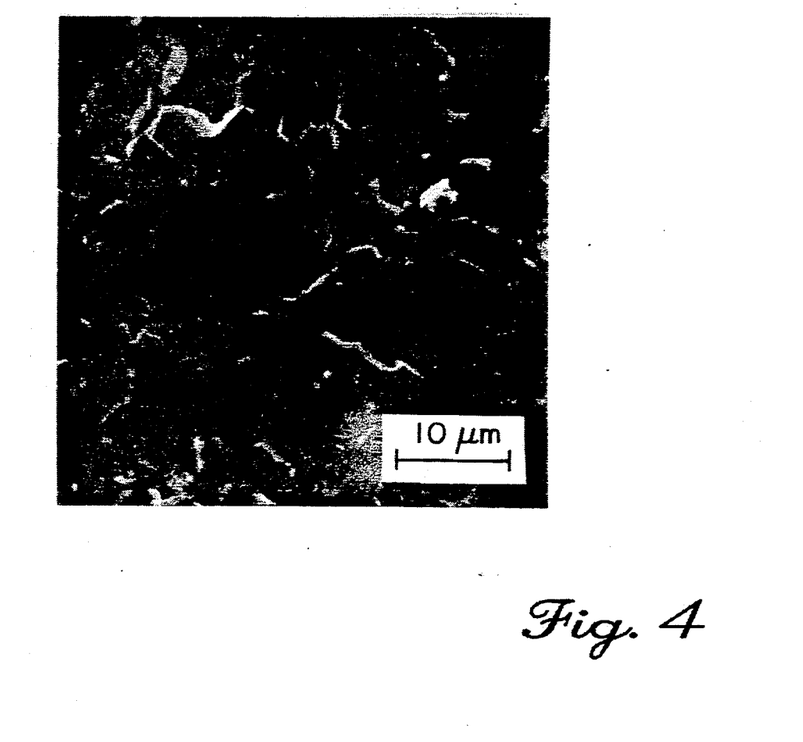
FIG. 4 is a scanning electron micrograph of the fracture surface of a cubic $ZrO_2$ and 10% partially stabilized zirconia specimen sintered at 1450° C. for 1½ hours.

The density of the sintered specimens of cubic $ZrO_2$ with PSZ inclusions in the present invention was greater than or equal to 96%. A typical scanning electron micrograph of the fracture surface of cubic $ZrO_2$ with 10% PSZ is shown in FIG. 4. The largest grain observed is approximately 10 microns and the fracture mode is mixed inter- and transgranular.

Figure 5:
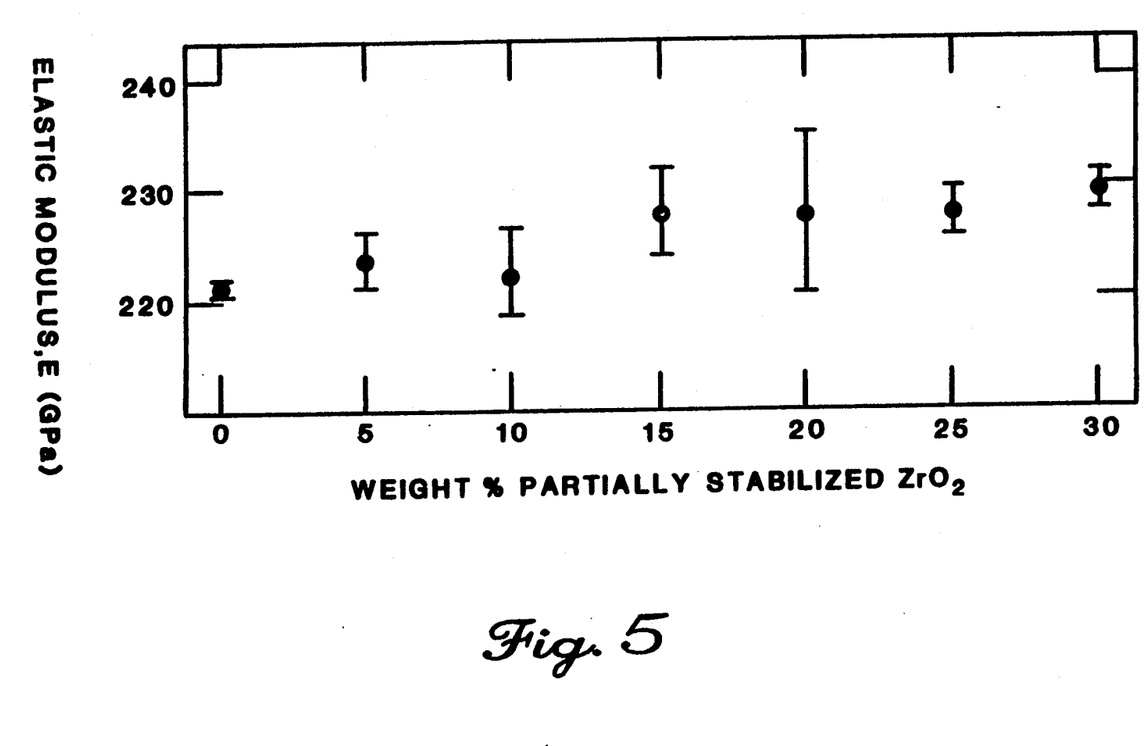
FIG. 5 is a graphic representation of the dependence of elastic modulus (E) on partially stabilized $ZrO_2$ content in a matrix of cubic $ZrO_2$.
Figure 6:
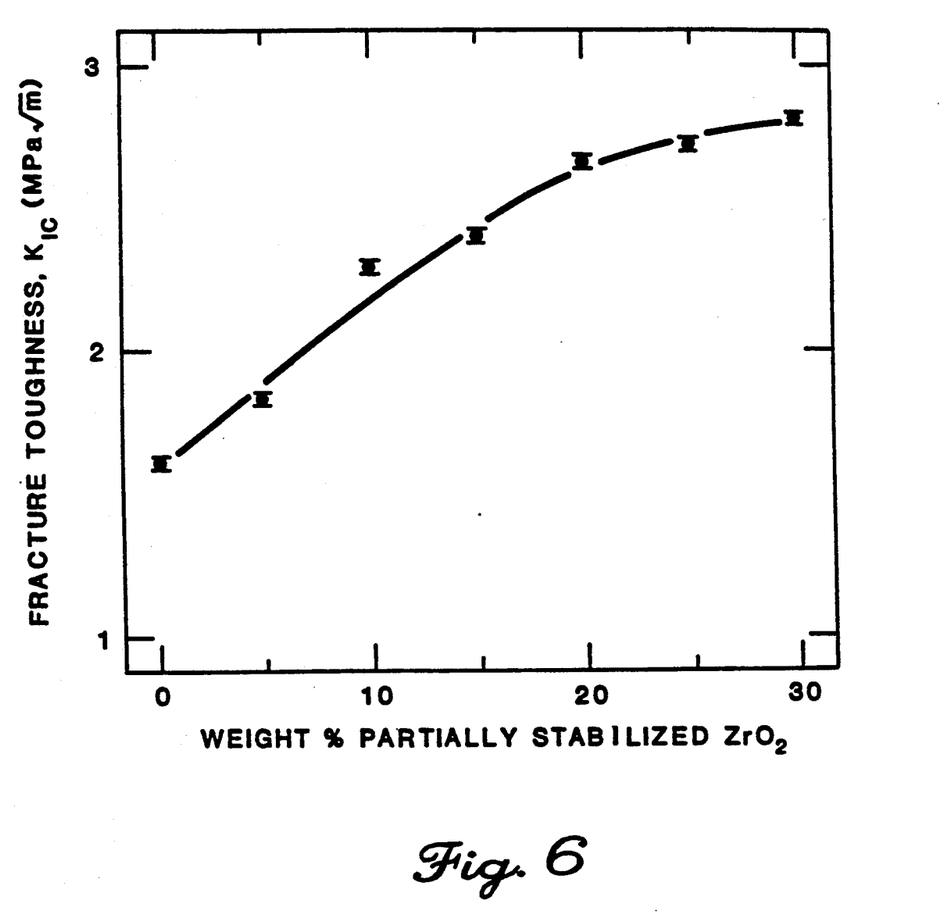
FIG. 6 is a graphic representation of the dependence of fracture toughness ($K_{IC}$) on partially $ZrO_2$ content in a matrix of cubic $ZrO_2$.

A plot of elastic modulus data is shown in FIG. 5 and indicates that there is very little change in the elastic modulus E (GPa) of cubic $ZrO_2$ with increasing PSZ content. This observation suggests that there is no microcrack formation in the cubic $ZrO_2$ matrix as a result of PSZ addition. The measured values of fracture toughness ($K_{IC}$) as a function of the wt. % of partially stabilized $ZrO_2$ added to the cubic $ZrO_2$ matrix is shown in FIG. 6. From this figure, it can be seen that the value of $K_{IC}$ increases with increasing PSZ content and that a value of 2.8 MPa $\sqrt{m}$ was obtained for 30 wt. % PSZ inclusions. This represents an approximately 1.7-fold increase in $K_{IC}$ of cubic $ZrO_2$ as a result of 30 wt. % PSZ addition. As expected, increasing PSZ content provided increased crack pinning sites resulting in an increase in $K_{IC}$.

Figure 7:
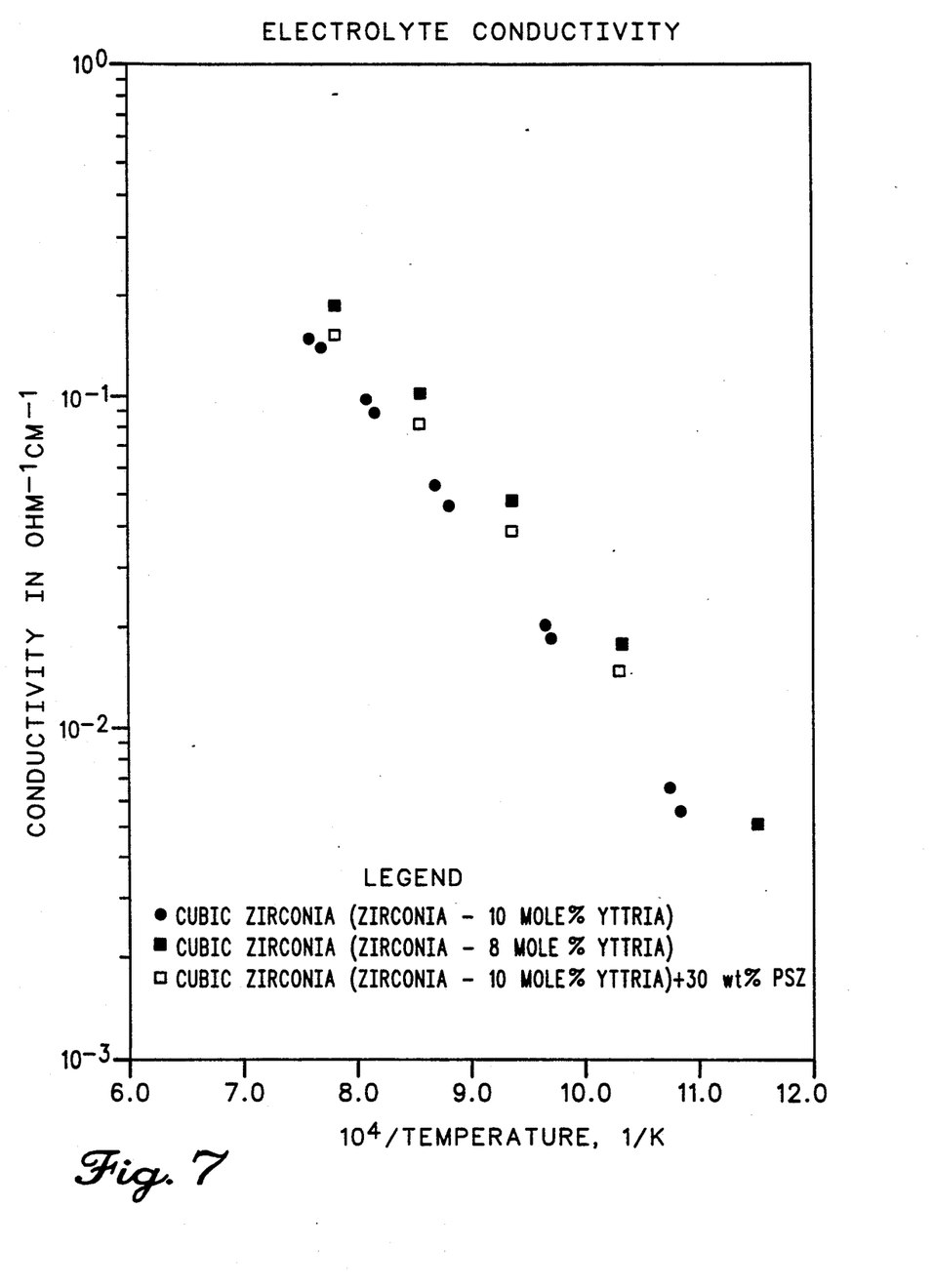
FIG. 7 illustrates the variation of electrical conductivity of cubic $ZrO_2$ and cubic $ZrO_2+30$ wt. % PSZ as a function of temperature.

Results obtained to date on cubic $ZrO_2$ tapes with and without PSZ inclusions indicate an increase in fracture toughness value from approximately 1.5 to 2.15 MPa $\sqrt{m}$ as a result of approximately 30% PSZ addition. It is to be noted that the electrical conductivity measurement on the sintered cubic $ZrO_2$ tapes with 30 wt. % PSZ indicated that the addition of 30 wt. % PSZ did not adversely affect the conductivity of the tapes, as shown in FIG. 7. From these results, it is clear that both monoclinic $ZrO_2$ and PSZ inclusions provide the needed improvement in fracture toughness for the structural reliability required of these ceramic-based conductors in the hostile environments in which they are frequently called upon to operate.

There has thus been disclosed a highly conductive material with improved fracture toughness which is particularly adapted for use in extreme temperature environments such as encountered in solid oxide fuel cells. In one embodiment, the added material (monoclinic ZrO$_2$) forms microcracks which absorb energy and improve toughness, while in another embodiment the added material (PSZ) forms crack pinning sites which retard crack propagation and improve the toughness of the conductor.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The embodiments of this invention in which an exclusive property or privilege is claimed are defined as follows:

1. A sintered electrically conductive product consisting essentially of cubic ZrO$_2$ as a matrix and partially stabilized zirconia (PSZ) in the range of 10–30 wt. % formed from particles having an average size of approximately 3 microns, wherein said electrically conductive product does not exceed approximately 10 microns in grain size.

2. The electrically conductive product of claim 4, wherein the ZrO$_2$ matrix and PSZ are sintered so that the PSZ particles form crack pinning sites, wherein said crack pinning sites retard propagation of cracks in the matrix of cubic ZrO$_2$ and increase the fracture toughness K$_{IC}$ value of said product to about 2.8 MPa$\sqrt{m}$.

3. The electrically conductive product of claim 1 wherein the cubic ZrO$_2$ matrix and PSZ are sintered at a temperature of at least 1350° C.

* * * * *

UNITED STATES PATENT AND TRADEMARK OFFICE
CERTIFICATE OF CORRECTION

PATENT NO. : 5,242,873
DATED : September 7, 1993
INVENTOR(S) : Singh et al.

It is certified that error appears in the above-indentified patent and that said Letters Patent is hereby corrected as shown below:

| | |
|---|---|
| Column 2, Line 37, | cancel "than 2"; |
| Column 3, Line 17, | cancel "dubic" and insert -- cubic $ZrO_2$, the present invention contemplates two approaches. The --; |
| Column 3, Line 19, | cancel "inclusion" and insert -- inclusions --; |
| Column 4, Line 9, | cancel "modules" and insert -- modulus --; |
| Column 5, Line 11, | after "of" insert -- PSZ is approximately four microns whereas the --; |
| Column 5, Line 12, | cancel "cles" and insert -- cle --. |

Signed and Sealed this

Nineteenth Day of April, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,242,873
DATED : September 7, 1993
INVENTOR(S) : Singh, et al

It is certified that error appears in the above-indentified patent and that said Letters Patent is hereby corrected as shown below:

Column 4, line 52 should read:

$$-- \quad R_c \geq 8\gamma_s / [P^2\{(1 + \nu_m)/E_m + 2(1 - 2\nu_i)/E_i\}] \quad --$$

Signed and Sealed this

Twelfth Day of July, 1994

Attest:

BRUCE LEHMAN

*Attesting Officer*    Commissioner of Patents and Trademarks